April 14, 1931.     H. FORD     1,800,615

BRAKE

Filed Aug. 4, 1930     4 Sheets-Sheet 1

INVENTOR.
Henry Ford.

Witness.

April 14, 1931.  H. FORD  1,800,615
BRAKE
Filed Aug. 4, 1930  4 Sheets-Sheet 2

INVENTOR.
Henry Ford
BY
ATTORNEY.

Witness.

April 14, 1931. H. FORD 1,800,615
BRAKE
Filed Aug. 4, 1930 4 Sheets-Sheet 3
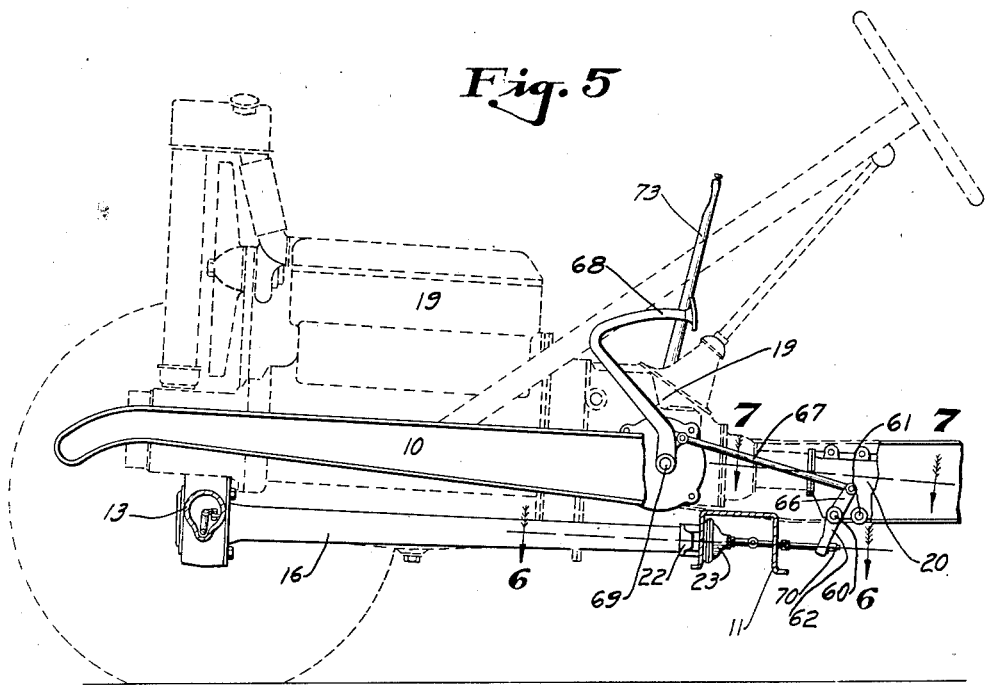
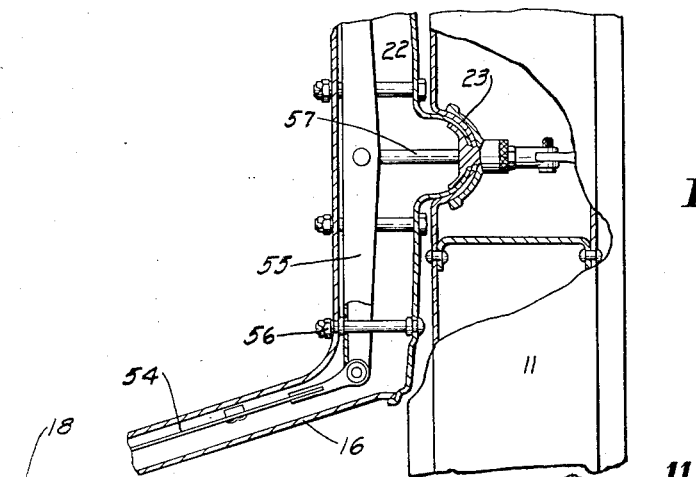
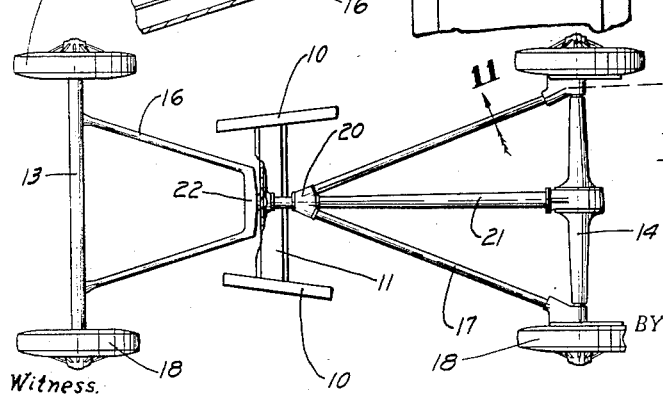
INVENTOR.
Henry Ford
BY
ATTORNEY.
Witness.
E. C. McRae April 14, 1931.   H. FORD   1,800,615
BRAKE
Filed Aug. 4, 1930   4 Sheets-Sheet 4

INVENTOR.
Henry Ford
BY
E. L. Davis
ATTORNEY.

Witness
C. C. McRae.

Patented Apr. 14, 1931

1,800,615

UNITED STATES PATENT OFFICE

HENRY FORD, OF DEARBORN, MICHIGAN, ASSIGNOR TO FORD MOTOR COMPANY, OF DEARBORN, MICHIGAN, A CORPORATION OF DELAWARE

BRAKE

Application filed August 4, 1930. Serial No. 472,890.

The object of my invention is to provide an automobile brake of simple, durable and inexpensive construction.

More particularly, my invention relates to an operating mechanism for applying brakes simultaneously on both the front and rear wheels of an automobile, the brake applying pressure exerted on each pair of the front or rear wheels being equalized to insure proper braking.

Still a further object of my invention is to provide a mechanically operated four wheel brake system wherein the control rods are totally enclosed to thereby prevent accidental damage to the rods and further, to protect the rods against the action of dirt and water. Heretofore, mechanically operated automobile brakes have universally been equipped with rods extending from each brake back to the center of the car where these rods are connected through suitable linkage to a foot pedal or brake lever. The linkage of this type of brake being exposed is subject to the deteriorating action of dirt and water so that the clevis pins and joints soon become loose thereby invariably causing rattle between the parts. In my improved structure, the brake applying rods are enclosed so that they may be periodically lubricated to thereby prevent wear and to prolong their life indefinitely.

Still further, my improved brake having the operating rods and levers fully enclosed is protected against accidental application of the brakes due to objects encountering one of the control parts. This feature alone is very desirable as it prevents accidental application of the brakes.

My improved brake is especially suitable for use on cars having front and rear radius rods as I prefer to house my brake operating mechanism in these rods. These rods are ordinarily of tubular section to resist the compression stress thereon so that no extra cost is encountered in so housing this mechanism.

With these and other objects in view, my invention consists in the arrangement, construction and combination of the various parts of my improved device, as described in the specification, claimed in my claims, and illustrated in the accompanying drawings, in which:

Figure 5 shows a side elevation of an automobile chassis having my brakes installed thereon, parts being broken away to better illustrate the connection.

Figure 6 shows a sectional view taken on the line 6—6 of Figure 5.

Figure 7 shows a sectional view taken on the line 7—7 of Figure 5.

Figure 8 shows a sectional view taken on the line 8—8 of Figure 7.

Figure 9 shows a plan view of a chassis illustrating the radius rod construction desirable to incorporate with my improved brake.

Figure 12 shows an alternate push rod housing which may be used in place of the device shown in Figure 3.

Figure 1:
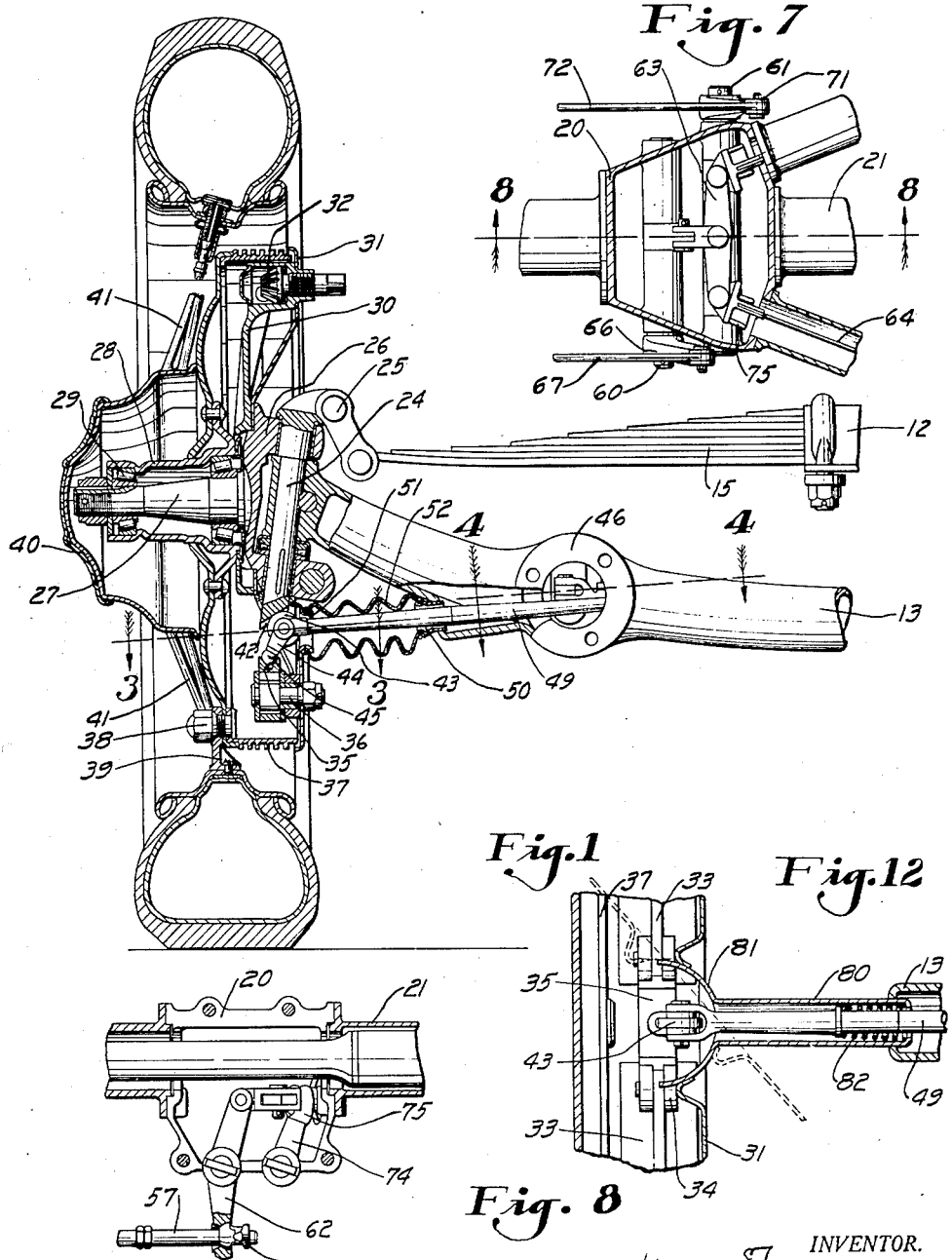
Figure 1 shows a vertical transverse sectional view through the front wheel of an automobile having my improved brakes installed thereon.
Figure 2:
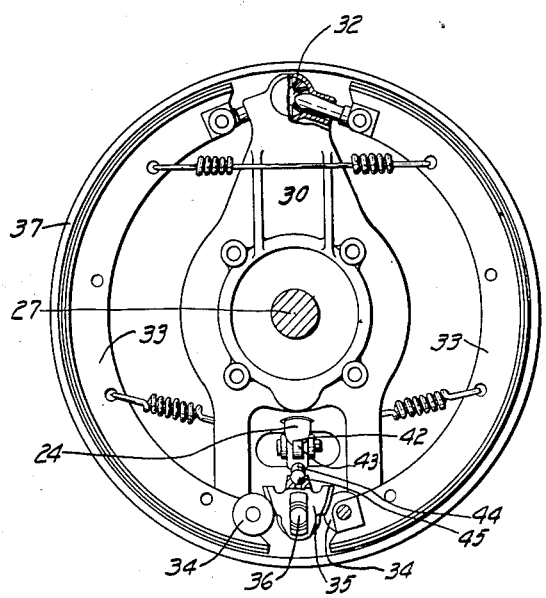
Figure 2 shows a plan view of one of the front brake anchor plates showing the position of the brake shoes and operating wedge.

Referring to the accompanying drawings, I have used the reference numeral 10 to indicate generally the slide members of an automobile chassis frame having a center cross member 11, and end cross members 12. Front and rear axles 13 and 14, respectively, are provided to support the chassis, these axles being connected to the end cross members 12 by means of transverse springs 15, and held against longitudinal movement by a front radius rod 16 and a rear radius rod 17. Wheels 18 are rotatably mounted on the ends of each axle in the ordinary manner, the front wheels, of course, being arranged to pivot so that the car may be steered.

An engine and transmission unit 19 is mounted on the forward end of the chassis, the rear end of this unit being secured to a housing just rearwardly of the center frame cross member. Extending forwardly from the rear axle 14 I have provided a torque tube 21 which terminates at the housing 20 to which it is secured. It will be noted from Figure 7 that the forward ends of the rear radius rods also terminate at this housing thereby forming an exceptionally strong and rigid construction.

I have purposely made my front axle 13 of tubular section so that the control rods for operating the front brakes may be conveniently housed within this tube. Each of the four wheels of my improved device is provided with an internal expanding brake and novel operating means are provided for each brake which is housed within the front axle and front and rear radius rods to thereby be protected from the weather or damage.

Referring to Figure 1, each end of the axle 13 is provided with a substantially vertical king pin 24 fixedly secured therein, the upper end 25 of which serves as a spring perch. A knuckle 26 is swivelly mounted on each pin 24 having a wheel spindle 27 formed integrally therewith upon which a wheel hub 28 is rotatably mounted by means of suitable roller bearings 29.

I have provided a brake anchor member 30 secured to the knuckle 26 and which also secures a dust plate 31 thereto, which plate forms the inner side of the brake shoe enclosure. The upper end of the anchor 30 is provided with a brake adjusting device 32, the purpose of which is to adjustably anchor the ends of a pair of semi-circular brake shoes 33 which are mounted on the anchor member 30. The lower end of each shoe 33 is provided with a pair of rollers 34 straddling the center web and between which a wedge 35 is reciprocally mounted so that the shoes will be spread by a downward movement of this wedge 35. A pin 36 projecting outwardly form the lower end of each anchor 30 guides the wedge for vertical reciprocation so that when the wedge is forced downwardly it will engage both pairs of rollers 34 thereby spreading both brake shoes into engagement with a brake drum 37 which is secured to the hub 28.

The brake drum 37 is provided with a plurality of wheel retaining bolts 38 spaced around its periphery, these bolts co-acting with suitable lugs 39 extending inwardly from the rim of the respective wheel 18 to thereby detachably mount this wheel on the spindle 27. Each wheel 18 consists of a central cup shaped hub shell 40 which encloses the bearing hub 28 and from which a plurality of spokes 41 radiate to the rim of the wheel. It will be noted that the wheel rims are mounted directly on the brake drum and that the hub 40 and spokes merely serve to keep the rim circular.

The lower end of each king pin 24 is provided with an outwardly and downwardly inclined track 42 which is disposed directly above the wedge 35. A roller 43 is arranged to roll on the track 42 and an arm 44 having a forked upper end in which the roller is pivotally mounted extends downwardly where its lower end is universally mounted by a ball joint 45 in the upper end of the wedge 35. It will thus be seen that an outward movement of the roller 43 will force the wedge 35 downwardly to thereby spread the brake shoes 33 into engagement with the brake drum.

Figure 4:
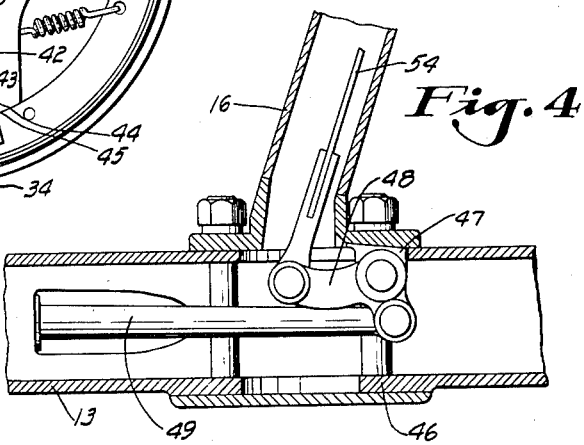
Figure 4 shows a sectional view taken on the line 4—4 of Figure 1.
Figure 3:
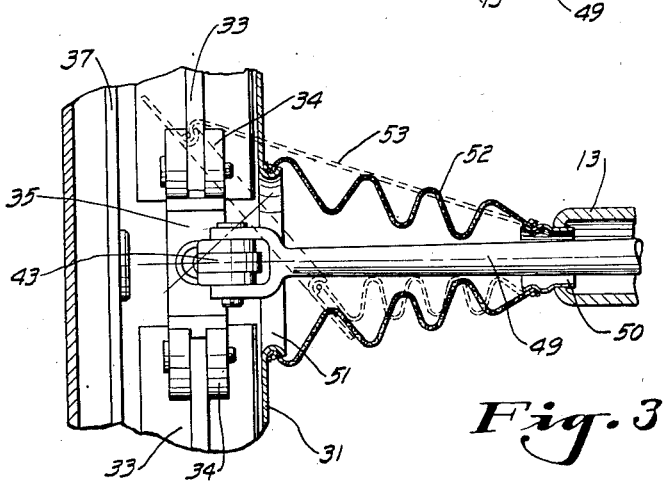
Figure 3 shows a sectional view taken on the line 3—3 of Figure 1.

Referring to Figures 1 and 4, I have shown means for moving the roller 43. The front axle 13 is provided with enlarged portions 46 adjacent to each of the radius rod connections and a bracket 47 formed on the forward end of each of these radius rods projects into the hollow portion of the axle. A bell crank lever 48 is pivotally connected to each bracket 47 and a push rod 49, pivotally connected to one arm of this lever, extends outwardly through an opening 50 in the lower wall of the axle 10 to position where its outer end is clevised around the roller 43. The dust plate 31 is provided with an elongated opening 51 through which the push rod extends to allow the dust plate to pivot around the outer end of this push rod. I have provided a flexible casing 52 the outer end of which is secured to the dust plate around the opening 51 and the inner end of which is fastened to the axle adjacent to the opening 50. This casing provides a dust tight enclosure for the push rod and brake operating mechanism irrespective of the swivelling action of the wheel. The position of this casing when the wheel is swiveled to its fully turned position is shown by dotted lines 53.

To operate the push rods 49 I have provided a pair of flat steel rods 54 which extend longitudinally through the radius rods 16. The forward ends of each of these rods are pivotally connected to the free arms of the bell cranks 48 so that a rearward movement of these rods operate both of the front wheel brakes. Referring to Figure 6, the rear ends of the radius rods 16 and 17 are joined by a transverse housing 22, the rear center portion of which is universally connected to the center cross member 11 at 23. The front axle is thereby rigidly held against longitudinal movement but is allowed to freely pivot relative to the chassis frame. A channel section cross beam 55 extends through the housing 22 and has each end thereof connected to the rear ends of the rods 54. This beam 55 is guided by housing tie bolts 56 and its center portion is connected to a rod 57 which extends rearwardly out through the axis of the universal connection 23. It will thus be seen that drawing the rod 57 rearwardly will hove the equalizing beam 55 rearwardly to thereby draw both rods 54 through the radius rods 16 and apply both of the front wheel brakes.

It will be noted from Figure 7 that the housing 20 is provided with a pair of cross shafts 60 and 61 rotatably mounted therein. The forward cross shaft 60 is provided with a cross arm 62, the lower end of which is adjustably fastened to the rod 57 while the upper end is provided with an equalizing beam 63 pivotally secured thereto within the housing 20. The outer ends of the equalizing beam 63 extends to position adjacent to the ends of the rear radius rods 17 and a pair of rear brake applying rods 64 are pivotally connected to the respective ends of the equalizing beam and extend rearwardly through these rear radius rods 17 to operate the rear brakes of the car.

Figure 10:
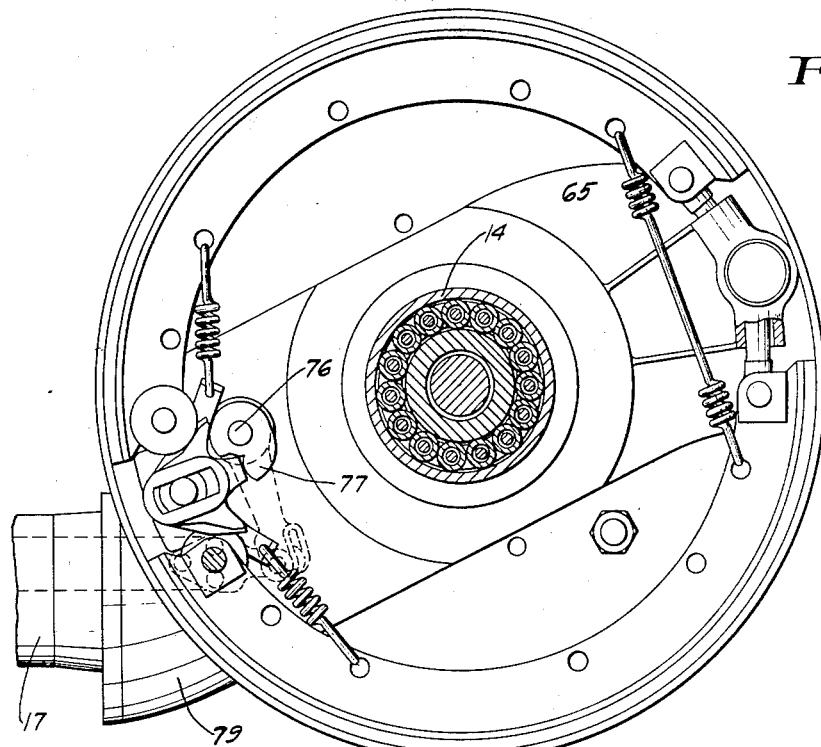
Figure 10 shows a plan view of one of the rear brake anchor plates showing the position of the brake shoes and operating wedge.
Figure 11:
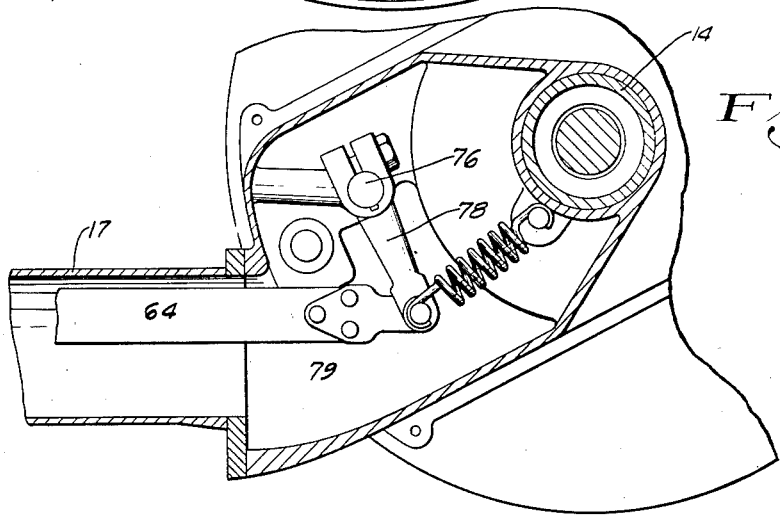
Figure 11 shows a sectional view taken on the line 11—11 of Figure 9.

Referring to Figures 10 and 11, I have provided rear brake anchor members 65 which are mounted on the ends of the rear axle housing 14. The rear brake shoes, adjusting mechanism, and operating wedges are duplicates of those used on the front wheel brakes, previously described, so that they have been given the same reference numerals as these like parts. The brake shoes and associated parts are mounted on the anchor member 65 in position to co-act with the brake drums of the rear wheels.

Due to the non-swivelling mounting of the rear brakes, I have provided a simple lever and cam for applying the rear brakes instead of the push rods 49 used on the front brakes. A shaft 76 is rotatably mounted in the anchor 65 just inwardly from the wedge 35 and a cam 77 is secured to the inner end of this shaft in position to urge the wedge outwardly when the shaft is properly rotated. An arm 78 is secured to the outer end of each shaft and is connected to the rear end of the respective brake rod 64 so that a forward movement of these rods will rotate the shafts 76 to thereby apply the rear brakes.

A housing 79 is formed on each of the anchors 65 which enclose the arms 78 and to which the rear ends of the rear radius rods 17 are secured. The operating mechanism for these rear brakes is thereby totally enclosed so as to be protected against dirt and water or accidental operation thereof.

One of the ends of the cross shaft 60 is provided with an arm 66 extending upwardly therefrom and a service brake rod 67 is pivotally connected to the upper end of this arm and extends forwardly where it is connected to a service brake pedal 68. This pedal is pivotally mounted at 69 to the engine and transmission unit. When the pedal 68 is depressed it draws the rod 67 thereby rotating the cross shaft 60 through the arm 66 and operates the rod 57 and equalizer beam 63 to thereby simultaneously pull the rods 54 and 64 through the front and rear radius rods, respectively. Both the front and rear brakes are thereby simultaneously operated. An adjusting nut 70 is disposed on the rear end of the rod 57 so that the front brakes may be made to take hold either before or after the application of the rear brakes without destroying the equalization between each pair of the brakes.

The rear cross shaft 61 is provided with an upwardly extending arm 71 to which an emergency brake rod 72 is pivotally secured. The rod 72 extends forwardly to an emergency brake lever 73 so that operation of this lever will rotate the arm 61. I have provided a pair of arms 74 extending upwardly from the shaft 61 within the housing 20, the upper ends of these arms having ears 75 thereon which straddle the forward ends of the rods 64. When the emergency brake lever is operated the ears 75 co-act with the forward ends of the rods 64 to thereby operate the rear set of brakes independently of the other brakes on the car.

Referring to Figure 12, I have shown a rigid casing 80 having a cylindrical end 81, which end is arranged to oscillate around the king pin axis in the dust plate 31. This casing encloses the push rod 49 and is urged into position by a coil spring 82. This device is for use in place of the flexible casing 52, if desired.

Among the many advantages arising from the use of my improved device it may be well to mention that I have provided a brake wherein the operating rods and applying mechanism are entirely enclosed within the parts normally associated with the ordinary automobile. Further, the rods being entirely enclosed are protected against the action of dirt and water or accidental operation and last as long as the car and add to its safety.

Still further, the clean cut appearance of a chassis having my improved brake installed thereon gives a definite sales advantage thereto.

Some changes may be made in the arrangement, construction and combination of the various parts of my improved device without departing from the spirit of my invention, and it is my intention to cover by my claims, such changes as may reasonably be included within the scope thereof.

I claim as my invention:

1. In a motor vehicle, the combination of a vehicle frame, front and rear axles, radius rods extending from each axle to said frame, braking wheels rotatably mounted on the ends of said axles, and operating rods for said brakes extending through said radius rods so as to be protected thereby.

2. In a motor vehicle, the combination of a vehicle frame, front and rear axles, tubular radius rods extending from each axle to said frame, braking wheels rotatably mounted on the ends of said axles, and operating rods for said brakes extending through said tubular radius rods so as to be protected thereby.

3. In a motor vehicle, the combination of a vehicle frame, front and rear axles, radius rods extending from each axle to substantially the center point of said frame, braking wheels rotatably mounted on the ends of said axles, and operating rods for said brakes extending through said radius rods so as to be protected thereby.

4. In a motor vehicle, the combination of a vehicle frame, front and rear axles, tubular radius rods extending from the outer ends of each axle to substantially the center point of said frame, braking wheels rotatably mounted on the ends of said axles, and operating rods for said brakes disposed in said radius rods so as to be protected thereby.

5. In a motor vehicle, the combination of a vehicle frame, front and rear axles, a pair of radius rods extending from the outer ends of each axle toward the center of the vehicle, braking wheels rotatably mounted on the ends of said axles, a housing connecting the free ends of each pair of radius rods, means for supporting said housings on said frame, and operating mechanism for said brakes extending through said radius rods and housings so as to form an enclosed mechanism for operating said brakes.

6. In a motor vehicle, a front axle, radius rods supporting said axle against longitudinal movement relative to said vehicle, wheels rotatably mounted on the ends of said axle, brakes on said wheels, and operating rods disposed in said radius rods for actuating said brakes.

7. In a motor vehicle, a frame, a front axle, radius rods extending from said frame to the respective ends of said axle, wheels rotatably mounted on the ends of said axle, brakes on said wheels, and operating rods disposed in said radius rods for actuating said brakes.

8. In a motor vehicle, a tubular front axle, tubular radius rods supporting said axle against longitudinal movement relative to said vehicle, wheels rotatably mounted on the ends of said axle, brakes on said wheels, and operating mechanism for said brakes extending through said axle and radius rods so as to be enclosed and protected thereby.

9. In a motor vehicle, a tubular front axle having wheels rotatably mounted on the ends thereof, brakes for said wheels, a brake equalizer housing pivotally mounted on said vehicle, a pair of tubular radius rods having their forward ends secured to said axle and their rear ends secured to said housing, push rods extending outwardly through said axle in position to operate said brakes, brake rods extending through said radius rods to operate said push rods, and an equalizer beam extending through said housing to operate said brake rods.

10. In a motor vehicle, a rear axle, radius rods extending from the outer ends of said axle to the center portion of said vehicle, braking wheels rotatably mounted on the ends of said axle, and operating mechanism for said brakes disposed within said radius rods.

11. In a motor vehicle, a rear axle, brake anchor plates secured to the ends of said axle, wheel brakes mounted on said anchor plates, radius rods extending from said anchor plate to the center portion of the vehicle, and brake operating rods extending through said radius rods so as to be enclosed thereby.

12. In a motor vehicle, a rear axle, brake anchor plates secured to the ends of said axle, wheel brakes mounted on said anchor plates, a brake operating shaft rotatably mounted in and extending through each of said anchor plates, arms secured to said shafts, a housing formed on the inner face of each anchor plate forming partial enclosures for said arms, tubular radius rods secured to said housings so as to complete said enclosures, said radius rods extending forwardly to the center portion of the vehicle, and brake operating rods extending through said radius rods and into said housings where they pivotally connect with said arms to form an enclosed operating mechanism for said brakes.

13. In a motor vehicle, a front axle having a pair of substantially vertical king pins secured in the ends thereof, a knuckle joint swivelly mounted on each of said king pins, brake anchor plates mounted on said knuckle joints, wheel brakes mounted on said anchor plates, an inclined track formed on the lower end of each king pin, and a reciprocating rod extending parallel to said axle having its outer end co-acting with said inclined track so that reciprocation of said rod will force the outer end thereof downwardly to thereby apply one of said brakes.

14. In a motor vehicle, a front axle having substantially vertical king pins secured in the ends thereof, a knuckle joint swivelly mounted on each of said king pins, brake anchor plates mounted on said knuckle joints, wheel brakes mounted on said anchor plates, an inclined track formed on the lower end of each king pin, and a reciprocating rod adapted to co-act with each of said inclined tracks to apply said brakes.

15. In a motor vehicle, a tubular front axle having wheels rotatably mounted on the ends thereof, brakes for said wheels, a pair of tubular radius rods connected with said axle and extending rearwardly to the center of the vehicle so as to form a continuous passageway from the ends of said axle to the center of the vehicle, brake operating rods extending through said radius rods, push rods extending through said axle from the radius rods to the brakes, and bell crank levers connecting said push rods and radius rods disposed within said passageway so as to provide an enclosed brake operating mechanism.

HENRY FORD.